July 28, 1931. P. R. G. BIEDERMANN 1,816,205
VALVE AND SEAT THEREFOR
Filed May 11, 1925
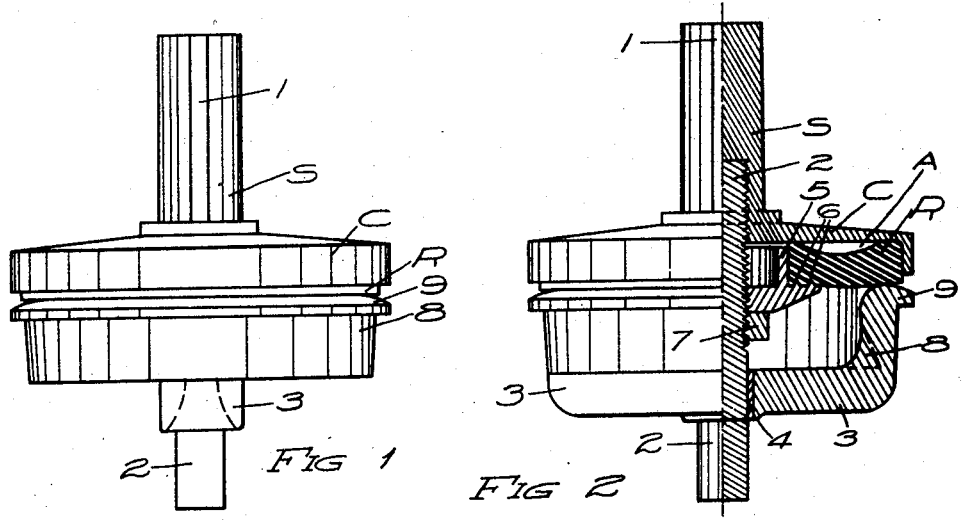
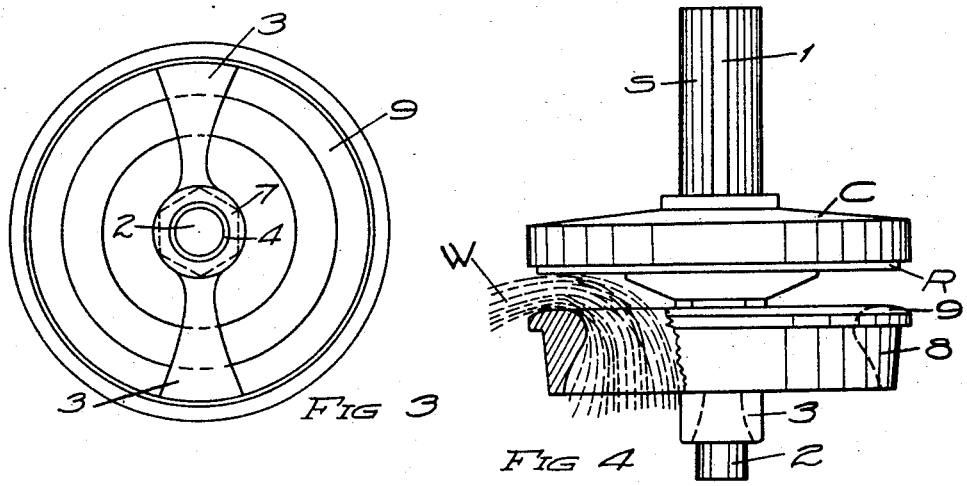
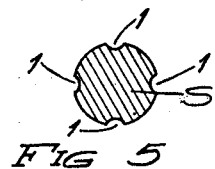
INVENTOR.
P. R. G. BIEDERMANN
BY Fred H. Hayn.
ATTORNEY.

Patented July 28, 1931

1,816,205

UNITED STATES PATENT OFFICE

PAUL ROBERT GEORGE BIEDERMANN, OF LOS ANGELES, CALIFORNIA

VALVE AND SEAT THEREFOR

Application filed May 11, 1925. Serial No. 29,435.

My invention relates to an improved valve, and a novel form of seat therefor, in which said seat will effectively be prevented from scoring, no matter what sort of fluid may be used therein, either gaseous or liquid, or whether said gas or liquid contains foreign substances of any size or character, said valve being especially adapted for use in connecton with slush or other pumps or internal combustion engines, or in fact, with any other form of pump or motor where such a valve is desired.

As is well known, it is a desideratum in engineering practice to provide for a tight seal between the active member of a valve and its seat or inactive member, and at the same time to prevent both of said members from scoring, no matter what sort of fluid may be used therewith, or the size and character of the foreign matter said fluid contains.

In slush pumps and the like it has been found in practice that sand and gravel often lodge between the valve and its seat, preventing the tight closing thereof, and at the same time causing a very rapid wear of both the valve and its seat, especially where a more or less flexible valve seat is used. Further, in oil well drilling the valves associated with the pumps must be so constructed that the gas in the well will be as ineffective as possible to cause any deterioration of the flexible valve disc ordinarily used, and which usually is composed of a rubber compound of some sort.

In all the valves heretofore proposed a straight inlet has been provided, the fluid being discharged in but one direction; that is, toward the outlet, resulting, as is obvious, in an uneven wear over only a portion of the valve seat, which wear soon causes the valve to leak, and thus causes slippage in the pump.

It accordingly is an object of my invention to provide a valve in which all of the above objectionable features are effectively eliminated, wear in said valve being reduced to a minimum, and its seat being absolutely non-scoring, and eliminating effectively any possibility of valve leakage.

A further object of my invention is to provide a novel form of valve and seat therefor, in which a resilient or flexible member is arranged to form an air cushion which is adapted effectively to remove any foreign matter which may become lodged between said members and the valve seat.

It is also an object of my invention to provide a novel form of valve in which the active member thereof is equipped with a cap housing a novel form of resilient member, which cap is adapted to reduce to a minimum the deleterious effect of gas, when said device is used in connection with an oil well, which member has also associated therewith a means for preventing it from creeping, said means, if desired, being in the form of one or more circular ridges, the seat or inactive member of said valve being curved, so that a single line contact may be had between said member and said seat, a bridge portion being associated with said seat, which bridge portion is also equipped with a removable element in the form of a wear-resisting bushing, which bushing is adapted to receive a centre guide associated with said valve.

A further object of my invention is to provide a novel form of valve which is simple in character, easy and inexpensive to construct, durable, thoroughly reliable and effective in operation, practically impossible to get out of order, and which will thoroughly and reliably effect the objects intended.

Further objects and advantages of my invention will become more apparent as the description thereof proceeds.

Reference is had to the accompanying drawings, in which similar reference characters denote similar parts. In the drawings, Fig. 1 is an elevational view of my novel form of valve and its seat, showing said valve in closed condition, Fig. 2 is a part sectional and a part elevational view of the valve and its seat, Fig. 3 is a bottom plan view of Fig. 1.

Fig. 4 is a part sectional and part elevational view showing the valve fully opened, and the manner in which the fluid is distributed in all directions over the valve seat, Fig. 5 is a cross sectional view through the valve stem.

Describing my invention more in detail, my improved valve is composed of two parts, an active member, constituting the valve proper, and an inactive member comprising the admission member for the fluid and the seat against which the active member acts.

The active member comprises a valve stem S equipped with a set of conventionally formed grooves 1 to provide for the release of the fluid, and said stem has integral therewith, or secured thereto in any desired manner a cap C constructed as more particularly shown in Fig. 2, said cap being used to protect a resilient element or washer R constructed preferably of a pliant material such as rubber, or rubber composition, from the deleterious effect of gas, especially when my improved valve is used in oil well practice.

The resilient member R is securely held within the cap C by means of a sleeve 5, shaped and constructed as shown, and positioned in any preferred manner on a guide stem 2, preferably, though not necessarily, screw threaded to said guide stem, a lock nut 7 being provided to lock said sleeve on said stem. The flange of the sleeve 5 is positioned in the central hole of the flexible or resilient member R, and if desired, the guide stem 2 may either be screw threaded into the valve stem S or secured thereto in any other preferred manner, or said guide stem may be formed integral with said valve stem S.

The resilient element R is provided with a hollowed out portion A to provide a space between said element and the cap C to provide an air cushion, the purpose of which is presently to be explained. As will be observed from Fig. 2, the element R is held within the cap C in such a manner that its bottom portion will be slightly bulged for a purpose presently to be explained. The sleeve 5 is equipped with a flanged portion positioned underneath the flexible element R and said flange is provided with one or more circular ridges 6 of preferably triangular cross-section, which ridges are adapted to bite into the element R to prevent the same from creeping.

The inactive member of my valve comprises a preferably cylindrical combined fluid admission member and valve seat, said member having a bridge portion 3, preferably shaped as more particularly shown in Fig. 3, to provide for a maximum admission opening for the fluid. Moreover, as shown in said figure, the cylindrical portion of the inactive member is tapered as shown to increase the opening for the admission of the fluid. The bridge portion 3 has its intermediate portion bored to receive a bushing or other member 4, which bushing may be removed at intervals when it becomes worn and replaced. Said bushing, if desired, may be constructed of tempered steel so as to resist wear.

As shown more particularly in Figs. 2 and 4, the inactive member 8 is equipped with a curved seat 9, said curve being such that a substantially linear contact may be maintained with the bulged member R of the active member. As is well known, it is very difficult to maintain a tight seal between two flat surfaces; hence, the feature of curving both active and inactive members to provide a line contact is of extreme importance. If flat surfaces were used, as has heretofore been done in practice, should the smallest grain of sand, for example, be lodged between such surfaces, a perfect closure would be prevented. With my invention, there is but a substantially single line contact, the sealing surface increasing as the pressure increases.

If it should happen that grit or other foreign matter become lodged between the member R and the seat 9, the air in the air cushion A being compressed will, as the valve rises from the seat 9, instantly dislodge the same the instant the valve opens.

The center guide stem 2 provides for a true vertical up and down movement of the valve, reducing wear to a minimum, the only possibility of wear residing in the bushing 4, which, as above explained, may be renewed from time to time, without removing the inactive member from the pump. Valves of the type described have proven very successful in practice, having met successfully all operating requirements.

While I have described and illustrated an air cushion merely, it will be clear that I do not desire to be limited to such a feature, as in practice I may use instead compounds of different character to provide for great resiliency, and, if desired, may even use other means to replace said air cushion.

As hereinbefore explained, ample fluid inlet space is provided in the inactive member by reason of its tapered configuration and also by reason of the shape and taper of the bridge portion 3. It will be observed also that the fluid is not discharged in only one direction, that is, toward the outlet of the valve, but flows over the valve seat 9 in all directions, as indicated by the broken lines W in Fig. 4, thus eliminating wear, and preventing leakage, said fluid being discharged very evenly over all parts of said seat, positively preventing scoring, and reducing to a minimum the wear caused by the friction of the fluid.

While I have thus described my invention with great particularity, it will be clear that the same may be modified throughout a wide range. I accordingly do not propose to be limited to the exact details of construction shown and described, but reserve the right in practice to make any and all modifications thereof that fall within the scope of the appended claims.

I claim as my invention:

1. A valve construction comprising a valve seat, a valve stem adapted to be moved through a perforation in said seat, a valve cap detachably associated with said stem, and a flat hollowed-out open resilient insert securely held in said cap, said hollowed-out portion functioning to provide an air cushion between said cap and said insert, said valve seat being so constructed that when said valve is closed, a substantially linear contact merely will be maintained between said insert and said seat.

2. In a valve, a hollow cylindrical body through which a fluid is adapted to pass, said body having an inwardly directed double arcuate throat forming a fluid checking outlet from said body, and provided with an outwardly flowing curviform seat which is contiguous and in curved alignment with said arcuate throat.

3. In a valve, in combination, a stem, a cap associated with said stem, an insert clamped within said cap, said insert being hollowed-out so as to provide an air cushion between said cap and said insert, and a convex seat for said valve, said insert and said seat when said valve is closed being adapted to coact, in a manner such that a substantial linear contact will be maintained therebetween.

4. In a valve, in combination, a stem, a substantially free and unobstructed curved and tapered inlet therefor, a convex seat for said valve, an inverted cup-shaped top member on said stem, adapted for movement relative to said seat, an annular insert positioned in said member, a cup-shaped flanged element positioned in the opening in said annular member, and means on said flange for preventing creeping of said insert.

5. In a valve, in combination, an insert in said valve, said insert comprising an annular member cut away on its top to provide an air cushion therein, a skeleton base, a cylindrical body member extending upwardly from said base, said member being equipped internally with a tapered cut-away portion defining a ledge extending inwardly from said member, and a convex seat on said member, said ledge functioning to check the velocity of the fluid as it enters said body member whereby scoring of said seat is effectively prevented.

6. In a valve, and seat therefor, in combination, a pair of relatively movable members, one of said members comprising a cap, an insert in said cap, said insert comprising an annular member cut away on its top to provide an air cushion therein, the other of said members being provided with a tapered cut-away portion, defining an annular ledge, said tapered cut-away portion functioning to check the velocity of the fluid as it enters one of said members and to direct said fluid upon the other of said members whereby scoring of said seat may effectively be prevented.

7. In a valve, a hollow cylindrical body through which a fluid is adapted to pass, said body having a gradually inward reversely curving outlet throat diametrically smaller than the inlet to said body to check the travel of fluid therethrough, and an outwardly flowing curving seat, a valve co-operating with said seat and yielding means in said valve and disposed in the direct path of the fluid discharging from said throat to buffet the force, and cause the discharge of the fluid between said valve and body.

8. In a valve, a hollow cylindrical body having an inlet and a reversely curved contracted outlet for checking the travel of fluid therethrough, said contracted outlet terminating beyond the area of contraction thereof in a curviform lip forming a seat, and a valve associated with said body and provided with means for buffeting the liquid passing through said body and dispersing it uniformly between said valve and seat throughout the circular extent thereof.

In testimony whereof I have signed my name to this specification.

PAUL ROBERT GEORGE BIEDERMANN.